Figure 1:
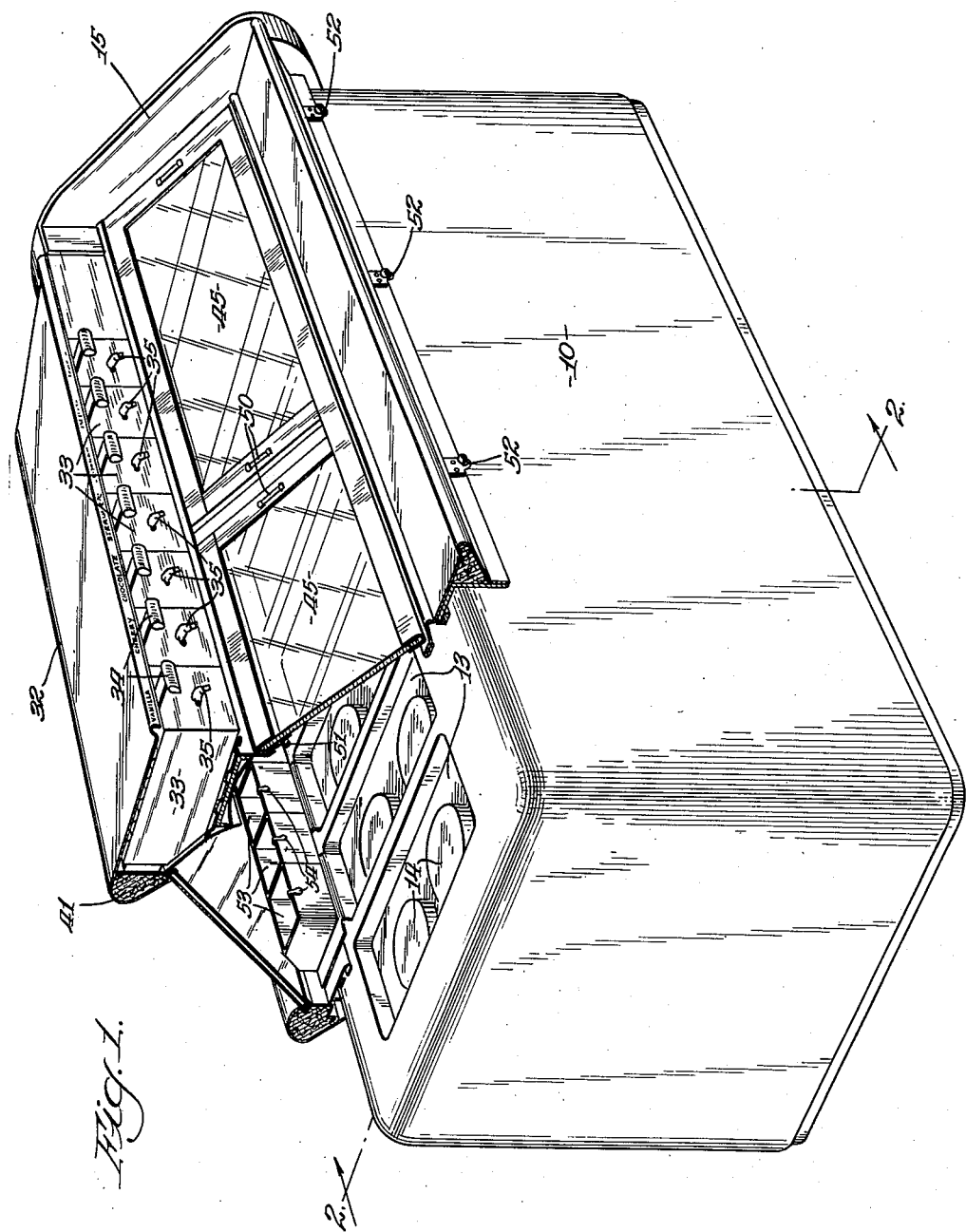

Aug. 8, 1950

W. S. FREDENHAGEN ET AL
DETACHABLE COVER AND SERVICE BAR
FOR FROZEN FOODS CONTAINERS 2,518,134

Filed Dec. 18, 1946

2 Sheets-Sheet 1

INVENTORS.
Walter S. Fredenhagen
BY Mark S. Schmidt

Richard D Mason
Atty.

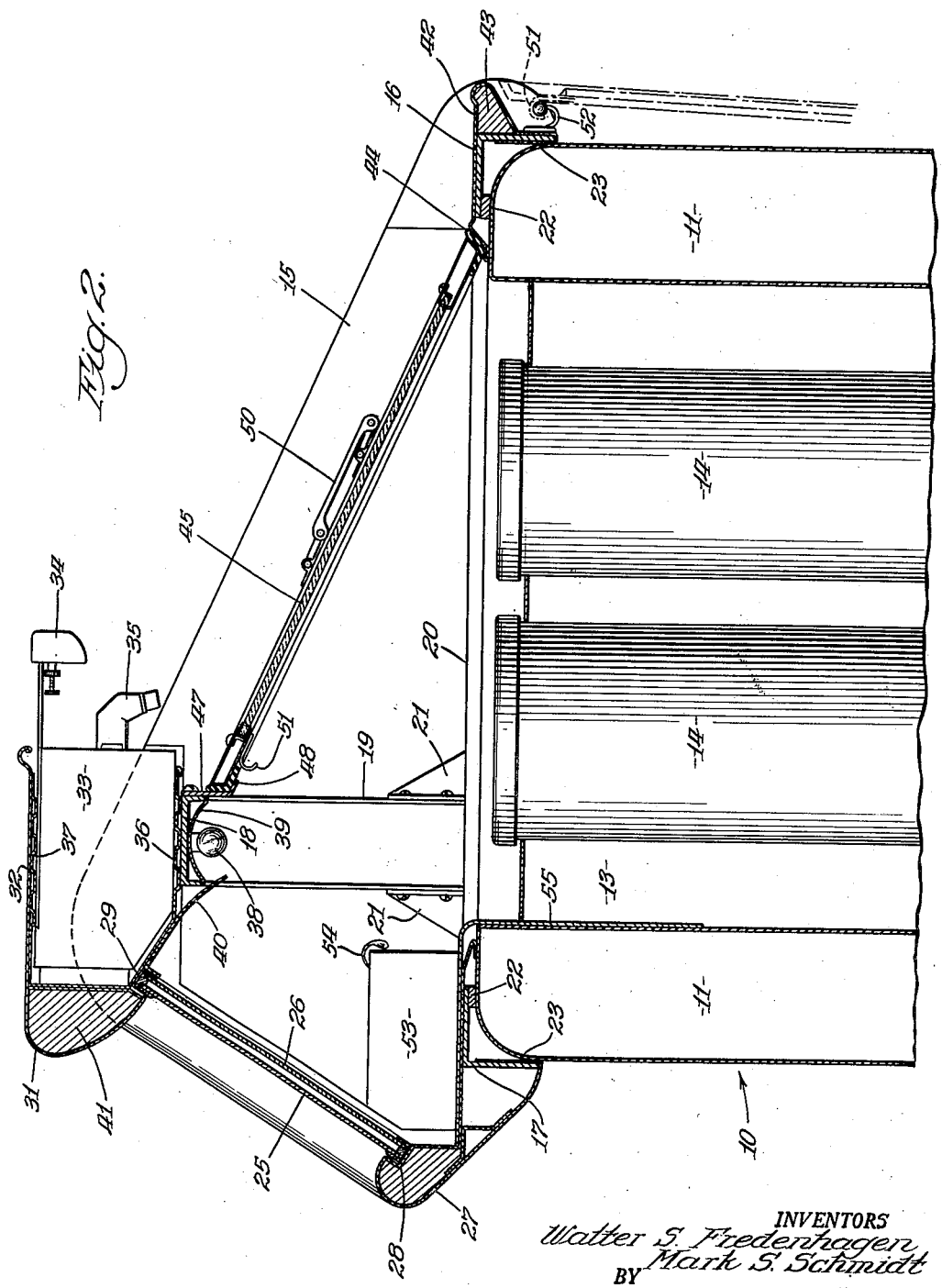

Patented Aug. 8, 1950

2,518,134

UNITED STATES PATENT OFFICE 2,518,134

DETACHABLE COVER AND SERVICE BAR FOR FROZEN FOODS CONTAINERS

Walter S. Fredenhagen and Mark S. Schmidt, Naperville, Ill.

Application December 18, 1946, Serial No. 717,024

4 Claims. (Cl. 62—89.5)

1

The present invention relates to a detachable display and service bar as well as a cover for frozen foods containers of the type which are commonly referred to as deep freezing units.

Frozen foods, such as ice cream and the like, are often dispensed from frozen foods containers or deep freezing units which are of relatively inexpensive construction. Such deep freezing units commonly comprise a rectangular cabinet formed with suitable insulating walls with a plurality of recesses accessible from the top of the unit into which frozen foods may be placed for storage purposes. These recesses are generally either of cylindrical or rectangular configuration. The deep freezing units are sometimes referred to as a three-hole unit or a five-hole unit which nomenclature applies to the number of the recesses for storing frozen foods. The recesses accessible from the top are usually closed by removable insulating covers of some sort. Such deep freezing units as have been described above are relatively inexpensive and are in very general use particularly in connection with the sale of bulk ice cream. Sometimes it is desirable to have a more elaborate frozen food dispenser and it would be desirable to be able to readily convert a deep freezing unit of the type mentioned above to a display and service bar with means for dispensing frozen foods in various forms.

Accordingly, it is the object of the present invention to provide a detachable service bar which may readily be applied to a deep freezing unit of the conventional type for converting such a deep freezing unit to a service bar and dispensing unit.

It is another object of the present invention to provide a detachable cover for a deep freezing unit which will convert such unit to a service bar with appropriate syrup dispensing attachments, container supports and the like, and which is so constructed that all ingredients used in making or mixing customer products, such, for example, as sundaes, are easily accessible to the attendant, thus providing for maximum operational efficiency on the part of the attendant.

Still another object of the present invention is to provide a detachable cover for a deep freezing unit for converting said deep freezing unit to a display unit and service counter or bar.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Fig. 1 is a perspective view of a refrigerating unit having the detachable cover including the combined display and service bar of the present invention associated therewith, with portions thereof cut away; and Fig. 2 is a sectional view taken on line 2—2 of Fig. 1.

Referring now to the drawings there is illustrated a suitable open top container 10 in the form of a frozen food container, commonly referred to as a deep freezing unit. Consequently, the walls thereof are of substantial thickness and as indicated in Fig. 2 having a substantial proportion thereof comprised of insulating material generally designated as 11. The container 10 is illustrated as of generally rectangular configuration and provided with a plurality of recesses 13, accessible from the top within which frozen foods may be stored. As illustrated in the drawings a plurality of containers such as 14 are disposed in each of the recesses 13, which containers may well contain ice cream or the like. The recesses 13 are adapted to be closed by means of suitable covers, not shown, one for each recess which are capable of being removed from the top. The arrangement described thus far forms no part of the present invention but merely comprises the conventional frozen food container in extensive use today in many establishments, particularly for dispensing bulk ice cream and the like.

In accordance with the present invention, there is provided a combined cover and display and service bar construction for attachment to a frozen food container such as 10, whereby the covers normally used for the individual recesses 13, are dispensed with and the combined cover and service bar arrangement to be described hereinafter, is applied to the frozen foods container or deep freezing unit 10. It should be understood that associated with the frozen foods container 10 is a suitable refrigeration unit with the necessary means for refrigerating a suitable refrigerant which may be circulated through tubes or portions of the wall of the container 10. The particular construction of such a refrigerating unit forms no part of the present invention and consequently it has been omitted from the description and the drawings for simplifying the same.

The display and service bar of the present invention which also provides a cover for the frozen foods container 10 described above, comprises a pair of somewhat triangular shaped end members 15, positioned so that the base of each triangular shaped member is substantially parallel with the top edge of the frozen foods container 10. The two apexes of each of the end members 15 at either end of the base thereof are interconnected by a pair of angle iron members 16 and 17, disposed so that the angle shaped portions are adapted to rest on the outside edges of the frozen foods container 10 as is clearly shown in Figs. 1 and 2 of the drawings. The triangular shaped members 15 are further interconnected by a suitable channel shaped member 18 disposed a substantial distance above the angle iron members 16 and 17 and intermediate the same. The two end members 15 and the angle iron members 16 and 17, together with the channel member 18, define a rigid structure which provides the framework for the combined display and service bar which also acts as the cover of the frozen foods container 10 of the present invention. To provide further strength or rigidity the channel member 18 may be provided at either end thereof with a vertically disposed channel member 19 suitably attached to its associated triangular member 15. If desired the lower end of each of the channel shaped members 19 may be suitably attached to associated angle iron members 20 or the like as by means of triangular shaped angle members 21 to give further rigidity to the unit and also to provide a close fitting arrangement with the ends of the frozen foods container 10 in the same manner that the angle iron members 16 and 17 engage the sides thereof.

For the purpose of providing a suitable seal between the detachable cover and service bar of the present invention and the frozen foods container 10 so that a minimum of heat may be transferred from the median in which the frozen foods container is disposed into the recesses 13 contained therein, there is provided along the angle iron members 16 and 17 suitable gasket members 22 and 23 which engage with the outside walls of the frozen foods container to provide a suitable seal as well as a cushion support for the display and service bar. It will be understood that associated with the cross members 20 at either end of the container similar gasket arrangements will be provided. It will furthermore be understood that the triangular shaped end pieces 15 are preferably constructed so as to provide a substantially non-heat-conducting wall. To this end they may be constructed of substantial thickness such as the walls of the frozen foods container 10 which walls comprise a substantial amount of heat insulation such as the insulation 11 mentioned above.

In order to provide a suitable display arrangement the display side of the detachable cover of the present invention comprises a transparent wall of any suitable form as illustrated in the drawings, this transparent wall includes a pair of panes of glass 25 and 26 which are disposed in parallel planes and displaced from each other by a small distance so as to define a suitable dead air space therebetween. With this arrangement a transparent wall which is substantially non-heat-conducting is provided and furthermore the double pane arrangement prevents frosting of the transparent wall so that the contents of the frozen foods container may readily be viewable by customers on the display side of the unit. Preferably the transparent display wall comprising the glass panes 25 and 26 extends from end to end of the unit between the triangular end sections 15. It will be understood that the lower edge of the channel shaped member 17 and the lower edge of the transparent wall section may be interconnected by a suitable metal member 27 to provide a generally finished appearance. If desired, heat insulation may be disposed between the finish wall 27 and a suitable wall defining the interior of the display and service bar. As illustrated the transparent display wall section comprising glass panes 25 and 26 is disposed in channel shaped members 28 and 29 suitably supported from the end wall sections 15. The finish wall 27 described above interconnects the angle iron 17 with the transparent wall supporting channel member 28.

It will be understood that a service bar for use in connection with dispensing frozen foods such as ice cream, usually comprises a plurality of containers for various flavored syrups which are applied to the ice cream for the purpose of making sundaes, sodas and the like. In accordance with the present invention there is provided above the channel iron 18 a service bar comprising a suitably shaped metal member 31 so as to define a flat counter portion 32 parallel with the channel iron 18. The end of the metal member 31 is suitably shaped at the display side of the detachable cover of the present invention as to define a pleasing appearance and to form a suitable junction point with the transparent wall, comprising the panes of glass 25 and 26. The space between the channel iron 18 and the service bar or counter portion 32 is so arranged as to accommodate a plurality of containers 33 for suitable flavoring syrups or the like. Each container 33 preferably includes a suitable manually actuated plunger device 34 for displacing some of the flavoring syrup contained therein so as to cause it to come out of a suitable spout 35 associated with the container 33 in a manner well understood by those skilled in the art. Suitable indicia may be provided adjacent the various containers 33 which as illustrated in the drawing may be marked with any of the names of well known flavors, such as vanilla, chocolate, cherry and so forth. In order that the containers 33 may be maintained in a detachable manner in the space defined between the channel iron 18 and the metal member 31 defining the counter 32 suitable corrugated members such as 36 and 37 may be provided. It will be understood that any other suitable means for detachably maintaining the containers 33 in the position shown in Fig. 1 of the drawings may be provided. These containers should be readily removable for the purpose of replenishing the flavoring syrup contained therein and for cleaning the same and the like.

To provide a more pleasing display of the frozen foods contained in the deep freezing unit 10 suitable means for illuminating the frozen foods container may be provided within the detachable cover of the present invention. As illustrated in the drawing a plurality of lights such as 38 may be disposed beneath the channel member 18 and a suitable reflector 39 may be associated therewith to cause the light to be properly distributed within the unit. To prevent the prospective customers from looking directly at the lights such as 38 a suitable metal member 40 may be provided which in addition furnishes a finished appearance in the interior of the combined detachable cover and service bar. It will be understood that suitable insulation such as 41 may be provided within the space defined by metal member 31 so as to keep the heat transfer through the detachable cover at a minimum. If desired suitable insulation may also be disposed either above or below the containers 33 depending upon the amount of refrigeration that is desired to be supplied to these containers.

In order to provide a generally pleasing appearance and furthermore to provide a flat work space on the work side of the unit, there is provided along angle iron 16 a suitable metal member 42 shaped in the manner best shown in Fig. 2 of the drawings to define a work space and furthermore to define a space within which suitable heat insulation such as is designated at 43 may be disposed. The inner end of the metal member 42 may be shaped to receive a suitable gasket member 44 for supporting a removable cover or series of covers 45 which are preferably illustrated as transparent covers so that a person dispensing the frozen foods from the frozen foods container may observe the contents thereof. The upper ends of these covers 45 are preferably supported on an angle member 47 mounted on channel iron 18. A suitable gasket member 48 is preferably disposed on the angle member 47 for sealing the engaging edges of the removable covers 45 in the same manner as the gasket 44 thereby providing a desirable seal against the transfer of heat between the exterior and interior of the frozen foods container. The removable covers 45 are disposed at an angle to the horizontal as is also the transparent wall comprising the glass panes 25 and 26. The covers 45 are preferably provided with suitable handles 50 to facilitate the removal thereof when the service bar is in use. As illustrated in the drawing, these covers 45 are provided with hook shaped portions 51 which are adapted to engage with suitable supporting members 52 disposed from the angle iron 16 to support the covers 45 when the service bar is in use as is clearly shown by dotted lines in Fig. 2 of the drawings.

It will be understood that in connection with an ice cream service bar for example, it is often necessary to have suitable crushed fruits or the like used in connection with making ice cream sundaes; for example, crushed pineapple, crushed cherries, crushed strawberries and the like. In accordance with the present invention, a plurality of jars or crushed fruit containers 53 are provided which are adapted to be disposed above the angle iron 17 and beneath the angularly disposed transparent wall comprising the glass panes 25 and 26. These crushed fruit containers 53 are generally open at the top and a suitable dipper such as 54 may be provided for each container. In order preferably to refrigerate these containers, there is illustrated for each container a conducting plate 55 of angular configuration having one end which extends into an associated recess 13 while the other end engages with the bottom of one or more of the containers 53. In this way a very good conductor of heat is provided so as to insure that the containers 53 are maintained at the desired temperature. It will be understood that the conducting area of conductor 55 may be varied in dependence upon the temperature that is desired to maintain. It will furthermore be understood that a similar arrangement may be employed in connection with the syrup dispensers or containers 33 described above.

In view of the detailed description included above, the operation of the combined display and service bar and detachable cover of the present invention will be obvious to those skilled in the art. It will furthermore be apparent that there has been provided a very simple and compact detachable cover arrangement which may be applied to any deep freezing unit of the conventional type, for converting the same into a display and service bar which provides ready access to the interior of the frozen foods container and in addition provides the necessary flavoring materials and the like for use in dispensing ice cream for example. Moreover, the arrangement is such that an attendant may stand behind the bar and easily ladle out or dispense any of the ingredients contained within the various containers carried by the bar, thereby to provide for fast, efficient work on the part of the attendant with the expenditure of very little effort. Also, the customer can readily observe the frozen foods being dispensed and a very attractive service bar and display arrangement is provided.

It should be understood that the present invention is not limited to the specific construction and arrangement described above, and that changes and modifications may occur to those skilled in the art without departing from the spirit and scope of the present invention. It is, therefore, aimed in the appendant claims to cover all such changes and modifications.

What is claimed as new and desired to be secured by Letters Patent of the United States is:

1. A detachable display and service bar unit for a frozen foods container of the open top type comprising means defining a frame having portions adapted to rest on said container in sealing engagement therewith including means for preventing relative lateral movement between said unit and said container, a service bar disposed along the top of said unit and supported by said frame, a transparent wall positioned between said bar and a portion of said frame to permit customers to view the contents of said container, a plurality of dispensing devices disposed beneath said service bar and supported by said frame, and means for closing the remainder of said unit whereby said unit when not in use acts as a cover for said container.

2. A detachable display and service bar unit for a frozen foods container of the type having a plurality of individual top opening frozen food receiving chambers defined therein, comprising means defining a frame having portions adapted to rest on said container in sealing engagement therewith, including means for preventing relative lateral movement between said unit and said container, a service bar disposed along the top of said unit and supported by said frame, a transparent display wall positioned between said bar and a portion of said frame, means for closing the remainder of said unit whereby said unit when not in use acts as a cover for said container, an enclosure within said unit, and heat conducting means for transferring heat from said enclosure to said container for maintaining the contents of said enclosure at a predetermined desired temperature.

3. A detachable display and service bar unit for a frozen foods container of the open top type comprising means defining a frame having portions adapted to rest on said container in sealing engagement therewith including means for preventing relative lateral movement between said unit and said container, a service bar disposed along the top of said unit and supported by said frame, a transparent wall positioned between said bar and a portion of said frame to permit customers to view the contents of said container, a plurality of dispensing devices disposed beneath said service bar and supported by said frame, means for closing the remainder of said unit whereby said unit when not in use acts as a cover for said container, and means associated with said unit for greatly reducing the heat transfer between said container and the surrounding atmosphere through said unit.

4. A combination cover, display and service bar construction, adapted for detachable support by an open top container, comprising side and end parts defining a frame, at least certain of said parts including means detachably engageable with the top edge of said container to restrain said frame against movement relative to said container, a service bar structure extending between and supported by said end parts in elevated position relative to said side parts, an angularly disposed transparent wall extending between said service bar structure and one of said side parts to partially cover the open top of said container on the customer viewing side thereof, and a plurality of dispensing devices disposed beneath said service bar structure accessible from the side of said container opposite the customer viewing side thereof.

WALTER S. FREDENHAGEN.
MARK S. SCHMIDT.

REFERENCES CITED

The following references are of record in the file of this patent:

UNITED STATES PATENTS

| Number | Name | Date |
|---|---|---|
| Re. 20,966 | Ottenheimer | Jan. 3, 1939 |
| 938,554 | Carpenter | Nov. 2, 1909 |
| 1,321,097 | Gongalez | Nov. 11, 1919 |
| 1,547,345 | Quat | July 28, 1925 |
| 1,978,565 | Cocks | Oct. 30, 1934 |
| 1,979,625 | Knapp | Nov. 6, 1934 |
| 2,073,955 | Ackerman | Mar. 16, 1937 |

FOREIGN PATENTS

| Number | Country | Date |
|---|---|---|
| 381,347 | Great Britain | Oct. 6, 1932 |